April 19, 1960  H. F. VON WIMMERSPERG  2,933,275
EXTENSIBLE, TELESCOPING LEGS FOR SUPPORTS
Filed Nov. 4, 1955  2 Sheets-Sheet 1
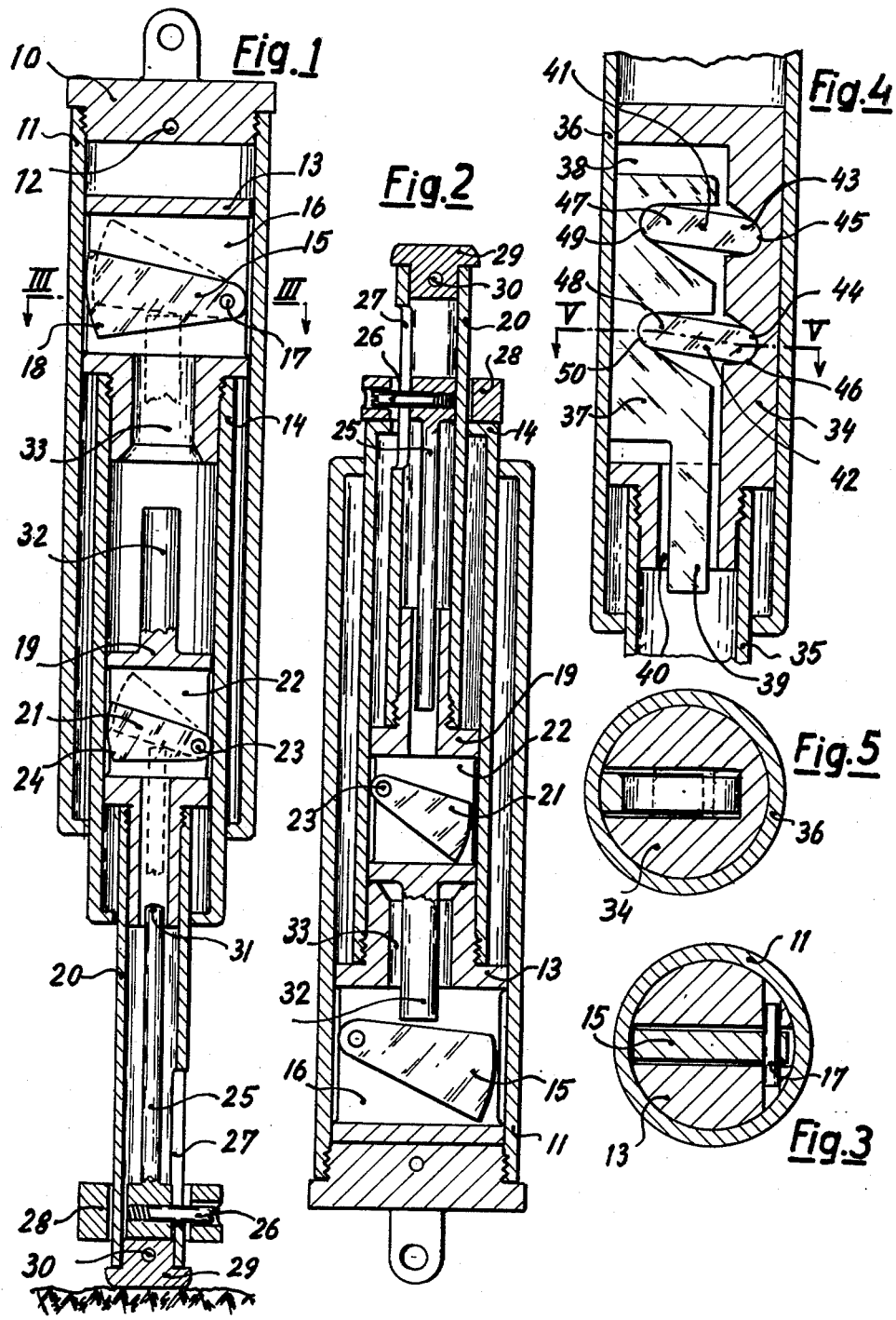

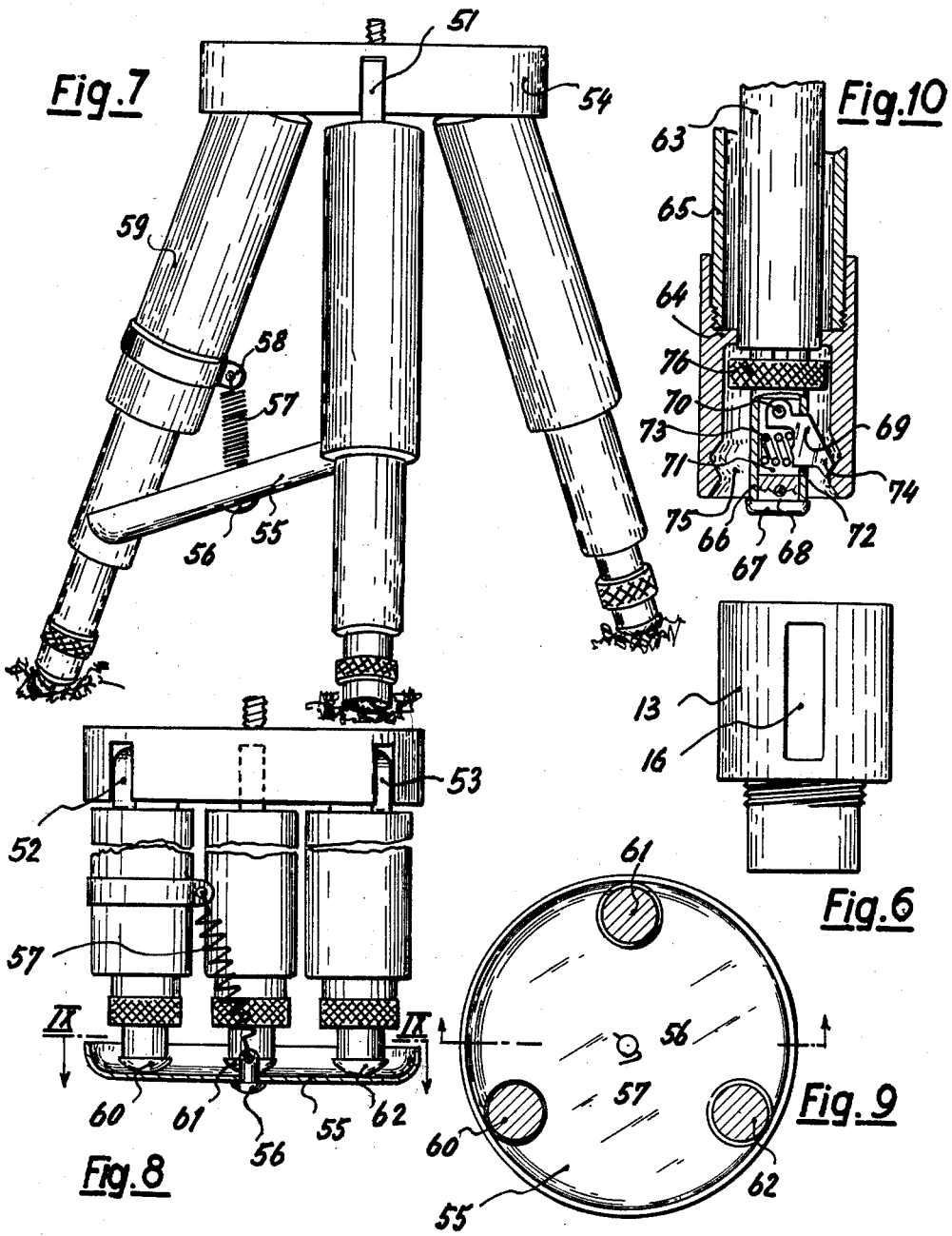

United States Patent Office 2,933,275
Patented Apr. 19, 1960

2,933,275

EXTENSIBLE, TELESCOPING LEGS FOR SUPPORTS

Heinrich Ferdinand von Wimmersperg, Detroit, Mich.

Application November 4, 1955, Serial No. 544,986

5 Claims. (Cl. 248—191)

This invention relates to telescoping legs for supports of adjustable height, and more particularly for supports for cameras, instruments, microphones, arms and tables.

The present telescoping extensible legs, adjustable to different heights, for supports for cameras use mostly friction locks between the telescoping leg members, which have to be operated by hand. Most of them are screw type clamps. A leg composed of three members needs two clamps. Each clamp needs three manual operations for every adjustment: release of the lock, adjustment of the leg member and locking. This means that at least 36 separate manual operations are necessary to extend and collapse the three legs of such a tripod.

The main object of the invention is to reduce the number of manual operations for erecting and collapsing the telescoping legs of a support.

Another object of the invention is to provide a telescoping leg with a clamp between the telescoping leg members, which permits a relative movement of the leg member in the direction of extension.

A further object of the invention is to provide a telescoping leg with a clamping device between the leg members, which locks the members as soon as a load is applied.

A further object of the invention is to provide a telescoping leg with a clamping device between the leg members, which is kept in the released position by gravity, when the telescoping leg is turned upside down.

Another object of the invention is to provide a telescoping leg with gravity activated means to release the clamping device between the leg members, when the leg is turned upside down.

A further object of the invention is to provide additional means of release of the clamping device locking the leg members, to facilitate adjustments of the leg length, when the leg is in position for use.

Other objects of the invention and novel features of the construction will be apparent from the following specification, when considered together with the accompanying drawings, in which Fig. 1 is a longitudinal section of an embodiment of the invention, a telescoping leg comprising three tubular leg members, partly extended, Fig. 2 is a section of the same leg in collapsed position, turned upside down, Fig. 3 is a cross-section III—III of Fig. 1, Fig. 4 is a longitudinal section through another embodiment of the invention, Fig. 5 is a cross-section V—V of Fig. 4, Fig. 6 is a side view of the lock head, Fig. 7 is a view of a tripod comprising legs according to the invention, in working position, the legs partly extended, Fig. 8 is a shortened view of the same tripod all legs collapsed and held together by a cap, the cap shown in cross section, Fig. 9 is section IX—IX of Fig. 8, and Fig. 10 is a longitudinal section of part of another embodiment of the invention.

In Fig. 1 the top 10 is screwed into the tubular leg member 11 and secured by pin 12. The clamp head 13 is permanently screwed into the tubular member 14. The flat cam 15 is located in slot-like chamber 16 of clamp head 13 constituting a housing means for said cam, and is hinged on pin 17. In the position which is shown in Fig. 1 its curved edge 18 rests on the inside of tube 11. The lock head or housing means 19 is rigidly screwed into tube 20. The cam 21 is located in slot-like chamber 22 of the lock head 19 and is hinged on pin 23. Its curved part 24 coacts with the tube 14. The rod 25 glides freely in tube 20. Its upper end is guided in a central bore of lock head 19 which establishes communication between said tube and the chamber of said lock head. The screw 26 protrudes through slot 27 of tube 20 and connects the rod 25 with the release ring 28, which glides freely on tube 20. The tip 29 is rigidly fastened to tube 20 by pin 30. The tube 14 glides freely in tube 11 and tube 20 so freely in tube 14 that tube 20 and tube 14 slide down by gravity if tube 11 is held vertically as shown in Fig. 1. If the height from which they were released was smaller than the extended length of the leg, the tip 29 strikes the ground, as shown in Fig. 1. The circular wedge part 24 of cam 21 is in contact with tube 14, as the gravity intends to rotate the cam counter-clockwise. The wedge angle is so small that the friction between tube and cam forces the cam further counter-clockwise, thus producing forces perpendicular to the tube axis, big enough to prevent further movement of tube 14. It is clear that the operating angle of the curve depends on the materials in contact. As the lock head 13 stands still any further movement of tube 14 is blocked. The same happens at the upper lock. The forces of gravity turn the cam 15 so that its wedge shaped part 18 contacts tube 11. As the lock head 13 is now stopped, any downward movement of tube 11 forces the cam 15 counter-clockwise and produces increasing forces perpendicular to the tube axis until all movement is stopped. The locking forces are proportional to the loads applied to the head 10: the bigger the load the bigger the locking forces. The elasticity forces of the tubes and the other parts of the locks keep the cam in the locking position even if the leg is lifted from the ground. Otherwise the tube 20 and the tube 11 would slide down to their full extended length. This residual locking feature is very important in the practical use of the telescoping leg.

It is possible to extend the leg further after having it locked in a not completely extended position by pulling the tube 20 or 14 while holding the head 10 or the tube 11, as the cams do not lock in this direction. To release the cams for a shortening of the legs the ring 28 is pushed upwards. Its upper end 31 strikes the cam 21 and turns it into the position dotted in Fig. 1. The tube 14 is freed from tube 20 and the tube 11, still locked to tube 14, can move downward until the stud 32 of lock head 19 moving through the bore 33 of lock head 13 strikes the cam 15 and turns it into the dotted position. Now tube 11 is free from tube 14 and the leg can be further shortened or even completely collapsed.

Another way of releasing the locks is to turn the leg quickly into a vertical position upside down. See Fig. 2. Then the rod 25 falls down and strikes the cam 21. The shock energy is in most of the cases sufficient to free the cam 21. Otherwise it is only necessary to give the leg a quick vertical jerk or to press the ring 28 down. The tube 20 slides down into the tube 14. The stud 32 strikes cam 15 and turns it into the released position. The tube 14 slides down into tube 11. The leg is collapsed as shown in Fig. 2. The whole process of extending the leg member, locking them into the desired position, then unlocking the leg members and collapsing them can be achieved fully automatically, just by turning the leg into the working position and turning it back into the upside down position. The number of leg members telescoping in one leg is not limited, as they release each other in succession. Further, with the same movement or turning over more than one leg can be brought into the working position and with the same movement they can all be collapsed together. The cross section of the leg members does not need to be circular. Even open channels can be used. It is further not necessary to use a cam as self locking element between the leg members.

Another embodiment of clamp is shown in Figs. 4 and 5. The lock head 34 is permanently screwed into tube 35 and glides in tube 36. The lock shoe 37 is located in a slot 38 of the lock head 34. Its arm 39 protrudes a square longitudinal hole 40 of the lock head 34. The two flat links 41 and 42 are located in slot 38. Their cylindrical ends 43 and 44 rest in cylindrical recesses 45 and 46 of the lock head 34, their likewise cylindrical ends 47 and 48 in cylindrical recesses 49 and 50 of the lock shoe 37. Gravity forces the lock shoe down and causes the links 41 and 42 to turn counter-clockwise, thus establishing a contact between tube 36 and lock shoe 37. The lock permits the tube 35 to slide down if the tube 36 is held vertically. As soon as the tube 35 is stopped either by striking the ground or otherwise, and a load is applied to tube 36, forcing it down, the friction between lock shoe 37 and tube 36 causes the links 41 and 42 to rotate and exert a force perpendicular to the tube axis. The increasing friction stops a further movement of tube 36 and the two leg members 36 and 35 are interlocked (clamped together). The lock gets released by forcing the arm 39 upwards in the manner shown at the first embodiment of the invention by a part gliding inside tube 35.

If it is not necessary to shorten the leg after it has been locked in working position, the outside release ring and screw 26 can be eliminated and the slot 27 avoided. The weight and the travelling space of the rod 25 have to be sufficient to produce a shock energy sufficient for release of the cam, when the leg is turned upside down quickly. A cam refusing to get unlocked this way can be released by pulling the leg tip 29 upwards and releasing it again while holding the leg upside down.

The Figs. 7 and 9 show a support for cameras or other instruments, using three legs, each having 3 members as shown in the first embodiment. The heads 50, 51 and 52 of the legs are fastened to the plate 54, so that the legs can spread, as known to art. The cap 55 is fastened by rivet 56, extxension spring 57 and ring 58 to the leg tube 59. It encloses all three leg tips 60, 61 and 62, prevents the leg members from sliding down and the legs from spreading. If the cap 55 is removed and the support is held with the plate 54 up all three legs extend automatically and get locked automatically as soon as the leg tips strike the ground and a load is applied to plate 54. The legs can be spread and the tripod can be moved without changing the length of the legs. If a leg has to be longer it is only necessary to pull it out. If it has to be shorter the release ring has to be pushed upwards by hand or with the ring of the sole of the shoe. Now the leg can be adjusted to any length and locked in this position by dropping the ring. When a load is applied, the leg is locked automatically. To collapse the tripod it is only necessary to close the legs and to turn the tripod quickly upside down. All legs collapse and the cap can be put over the leg tips.

For some purposes a one-legged support is sufficient. In this case it is possible to avoid the cap and with it the necessity of removing and replacing it. Fig. 10 shows the tip end of one-legged support in collapsed position. The tube 63 is guided in the sleeve 64, which is screwed permanently to tube 65. The tube 66 is guided in tube 63 and closed by tip 67, which is held in position by pin 68. The lever 69 is hinged on pin 70 in a slot 72 of tube 66. The spring 73 causes the lever 69 to turn counter-clockwise until it rests on the wall of the tube 66. The end 74 of the lever 69 rests in the ring groove 75 of sleeve 64, thus preventing the tube 66 from sliding down under the force of gravity. A short vertical jerk causes the tube 66 to push the lever end 74 out of the groove 75. The tube 66 slides down until it strikes the ground or until full extension is reached. To collapse the leg the external release ring 76 is pressed upwards or the leg is turned upside down as described earlier.

Although I have described my invention with a certain degree of particularity, it is understood that the present disclosure has been made only by way of example and that numerous changes in the details of construction and arrangement and combination of the parts may be resorted to without departing from the spirit and the scope of the invention as hereinafter claimed.

Therefore, what I claim as new and desire to secure by Letters Patent is:

1. An adjustable support comprising a top plate having a plurality of legs connected thereto, each leg comprising at least three telescopically arranged leg members, namely, an outer leg member, an intermediate leg member and an inner leg member, a pair of friction lock means for securing said inner and intermediate leg members and said intermediate and outer leg members respectively in adjusted position, each of said friction lock means including a member movable in response to gravity when the legs are in a generally upright position to interengage said inner and intermediate leg members and said intermediate and outer leg members respectively and prevent inward telescoping movement thereof, each of said gravity responsive members having an edge portion disposed in wedging relation with the adjacent leg member when the legs are in said generally upright position whereby when said leg members are urged into inward telescoping relation while in an upright position, said movable members move into wedge locking relation with the adjacent leg members and become unresponsive to gravity to move when the leg assembly is raised in an upright position and thereby retain the leg members in adjusted position and means for breaking said wedge locking relation comprising a gravity responsive weight member freely movable axially in said inner leg member and arranged when the legs are shifted from said generally upright position to a generally inverted position to strike said movable member of the friction lock means between the inner and intermediate leg members with said sufficient force to break said wedge locking relation, said inner leg member having a portion adjacent the upper end thereof adapted to engage said movable member of the friction locking means between the intermediate and outer leg members in response to movement of said inner leg member inwardly of the intermediate leg member to break said wedge locking relation of the latter movable member.

2. The combination called for in claim 1 wherein said weight member has a portion thereof extending outwardly of said inner leg member adjacent the lower end thereof for enabling manual actuation thereof.

3. A telescoping leg assembly comprising at least three telescopically arranged leg members, namely, an outer leg member, an intermediate leg member and an inner leg member, a pair of friction lock means for securing said inner and intermediate leg members and said intermediate and outer leg members respectively in adjusted position, each of said friction lock means including a member movable in response to gravity when the legs are in a generally upright position to interengage said inner and intermediate leg members and said intermediate and outer leg members respectively and prevent inward telescoping movement thereof, each of said gravity responsive members having an edge portion disposed in wedging relation with the adjacent leg member when the legs are in said generally upright position whereby when said leg members are urged into inward telescoping relation while in an upright position, said movable members move into wedge locking relation with the adjacent leg members and become unresponsive to gravity to move when the leg assembly is raised in an upright position and thereby retain the leg members in adjusted position, and means for breaking said wedge locking relation comprising a gravity responsive weight member freely movable axially in said inner leg member and arranged when the legs are shifted from said generally upright position to a generally inverted position to strike said movable member of the friction lock means between the inner and intermediate leg members with said sufficient force to break said wedge locking relation, said inner leg member having a portion adjacent the upper end thereof adapted to engage said movable member of the friction locking means between the intermediate and outer leg members in response to movement of said inner leg member inwardly of the intermediate leg member to break said wedge locking relation of the latter movable member.

4. An extensible telescoping leg assembly comprising an inner leg member telescopically arranged within an outer leg member, said inner leg member being hollow and having friction lock means adjacent the upper end thereof, said lock means including a member movable in response to gravity when the leg assembly is in a generally upright position to interengage the two leg members and prevent inward telescoping movement thereof, said inner leg member having housing means at the upper end thereof providing a chamber in communication with said inner member for housing the movable member and being operative to limit its motion within said inner leg member between unlocked and locked positions, said movable member having an edge portion disposed in wedge locking relation with the outer leg member when in said generally upright position, and means for breaking said wedge locking relation comprising a gravity responsive weight member arranged within the inner leg member for free axial sliding movement therein and having an axial portion disposed to pass into said housing chamber and to engage the movable member, said weight member in the upright position of said support resting, by reason of gravity, within and adjacent the lower end of the inner leg member and being responsive to gravity when the support is inverted to slide axially through the inner leg member into said housing chamber and strike said movable member of the friction lock means within said housing means with a force sufficient to break said wedge locking relation.

5. An extensible telescoping leg assembly substantially as set forth in claim 4, wherein said friction lock means further includes a cooperable portion of the housing means.

References Cited in the file of this patent
UNITED STATES PATENTS

| | | |
|---|---|---|
| 178,733 | Carter et al. | June 13, 1876 |
| 389,005 | Peck | Sept. 4, 1888 |
| 398,408 | Koehn | Feb. 26, 1889 |
| 882,870 | Cary | Mar. 24, 1908 |
| 1,859,223 | Stevenson | May 17, 1932 |
| 2,437,510 | Ditty | Mar. 9, 1948 |
| 2,687,866 | Johnson | Aug. 31, 1954 |
| 2,722,970 | Stechmann | Nov. 8, 1955 |
| 2,790,657 | Wilder | Apr. 30, 1957 |

FOREIGN PATENTS

| | | |
|---|---|---|
| 227,920 | Germany | Oct. 31, 1910 |